United States Patent [19]

Saboorian et al.

[11] Patent Number: 6,061,560
[45] Date of Patent: May 9, 2000

[54] METHOD AND APPARATUS FOR DELIVERING AND PRESENTING CALLING NAME INFORMATION IN A WIRELESS COMMUNICATIONS SYSTEM

[75] Inventors: Khosrow Tony Saboorian, Plano; Sonia Doshi, Dallas; Donald Bruce Keeler, Plano, all of Tex.

[73] Assignee: Nortel Networks Corporation, Montreal, Canada

[21] Appl. No.: 08/846,330

[22] Filed: Apr. 30, 1997

[51] Int. Cl.[7] .................................................. H04M 3/42
[52] U.S. Cl. .......................... 455/415; 370/320; 370/321
[58] Field of Search ................................... 455/414, 415, 455/418, 419, 420, 433, 517, 560, 461, 417, 458, 567; 370/320, 321, 341, 342, 337

[56] References Cited

U.S. PATENT DOCUMENTS

| | | | |
|---|---|---|---|
| 5,559,860 | 9/1996 | Mizikovsky | 379/58 |
| 5,563,931 | 10/1996 | Bishop et al. | 379/59 |
| 5,581,599 | 12/1996 | Tsuji et al. | 379/63 |
| 5,724,411 | 3/1998 | Eisdorfer et al. | 379/93.23 |
| 5,745,852 | 4/1998 | Khan et al. | 455/433 |
| 5,781,628 | 7/1998 | Alperovich et al. | 380/9 |
| 5,794,149 | 8/1998 | Hoo | 455/438 |
| 5,878,115 | 3/1999 | Valentine et al. | 379/59 |
| 5,878,397 | 3/1999 | Stille et al. | 704/466 |
| 5,884,175 | 3/1999 | Schiefer et al. | 455/436 |
| 5,884,179 | 3/1999 | Patel | 455/445 |
| 5,890,063 | 3/1999 | Mills | 455/433 |
| 5,890,065 | 3/1999 | Seo et al. | 455/445 |

FOREIGN PATENT DOCUMENTS

| | | | |
|---|---|---|---|
| WO 94/29992 | 12/1994 | WIPO | H04M 3/38 |
| WO 97/01252 | 1/1997 | WIPO | H04Q 7/08 |

OTHER PUBLICATIONS

Ray Powers and Elena M. Worrall, "Calling Name Delivery—Cooperative Industry Efforts to Meet Identified Customer Needs," pp. 633–637.

*Primary Examiner*—Fan S. Tsang
*Assistant Examiner*—Congvan Tran
*Attorney, Agent, or Firm*—John D. Crane; Daniel E. Venglarik; Andrew J. Dillon

[57] ABSTRACT

A method and apparatus in a wireless communications system for presenting a calling party name to a mobile station within the wireless communications system. A communications signal is received from a network to initiate a call to a mobile station within the wireless communications system. Next, a determination is made as to whether the mobile station is provisioned to receive calling party names in response to receiving the communications signal. A calling party name is either identified using a database located within the wireless communications system or the calling party name is received as part of the initial call setup signal. Then, the calling party name is sent to the mobile station over the air interface in response to identifying the calling party name.

41 Claims, 21 Drawing Sheets

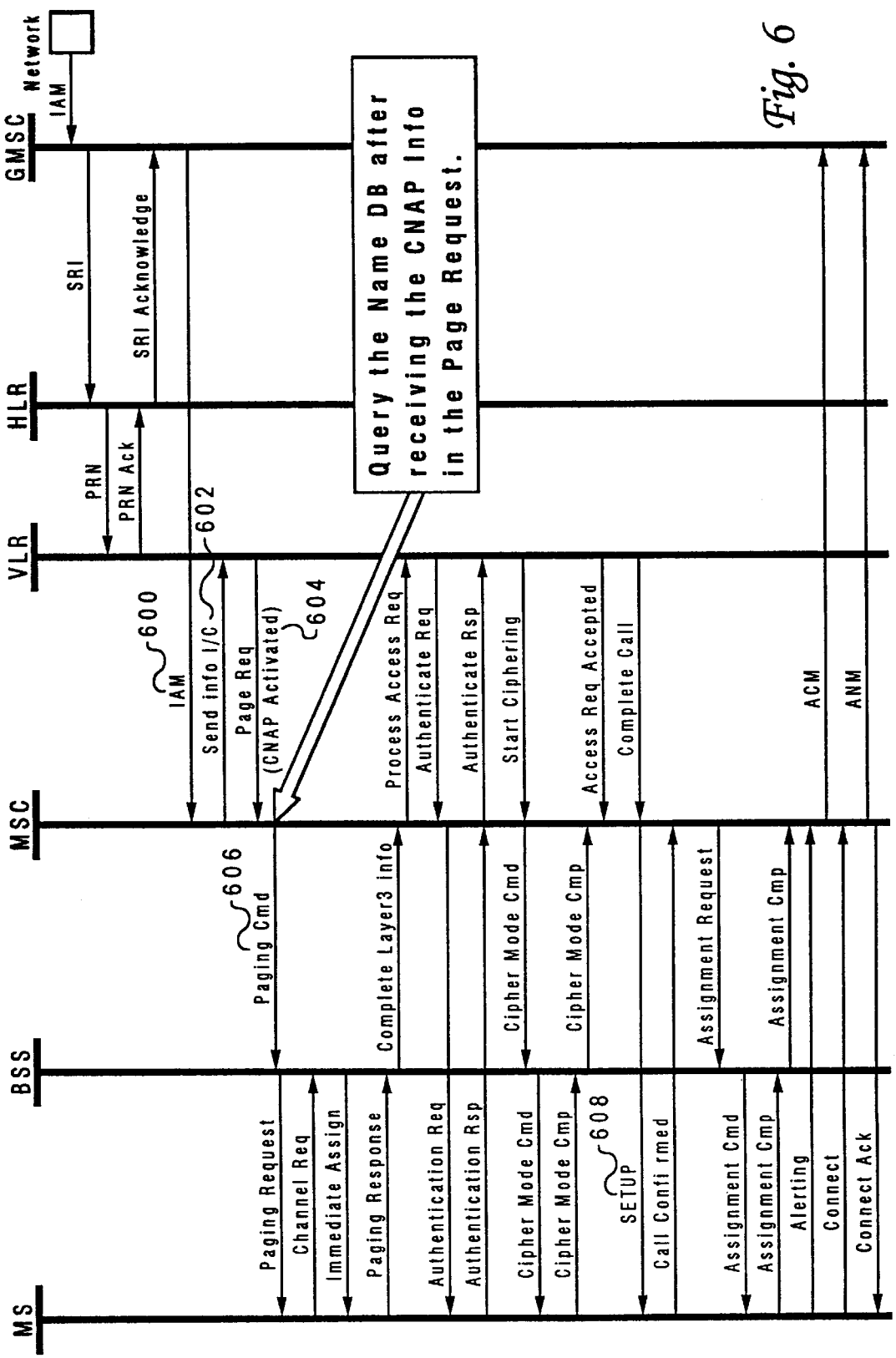

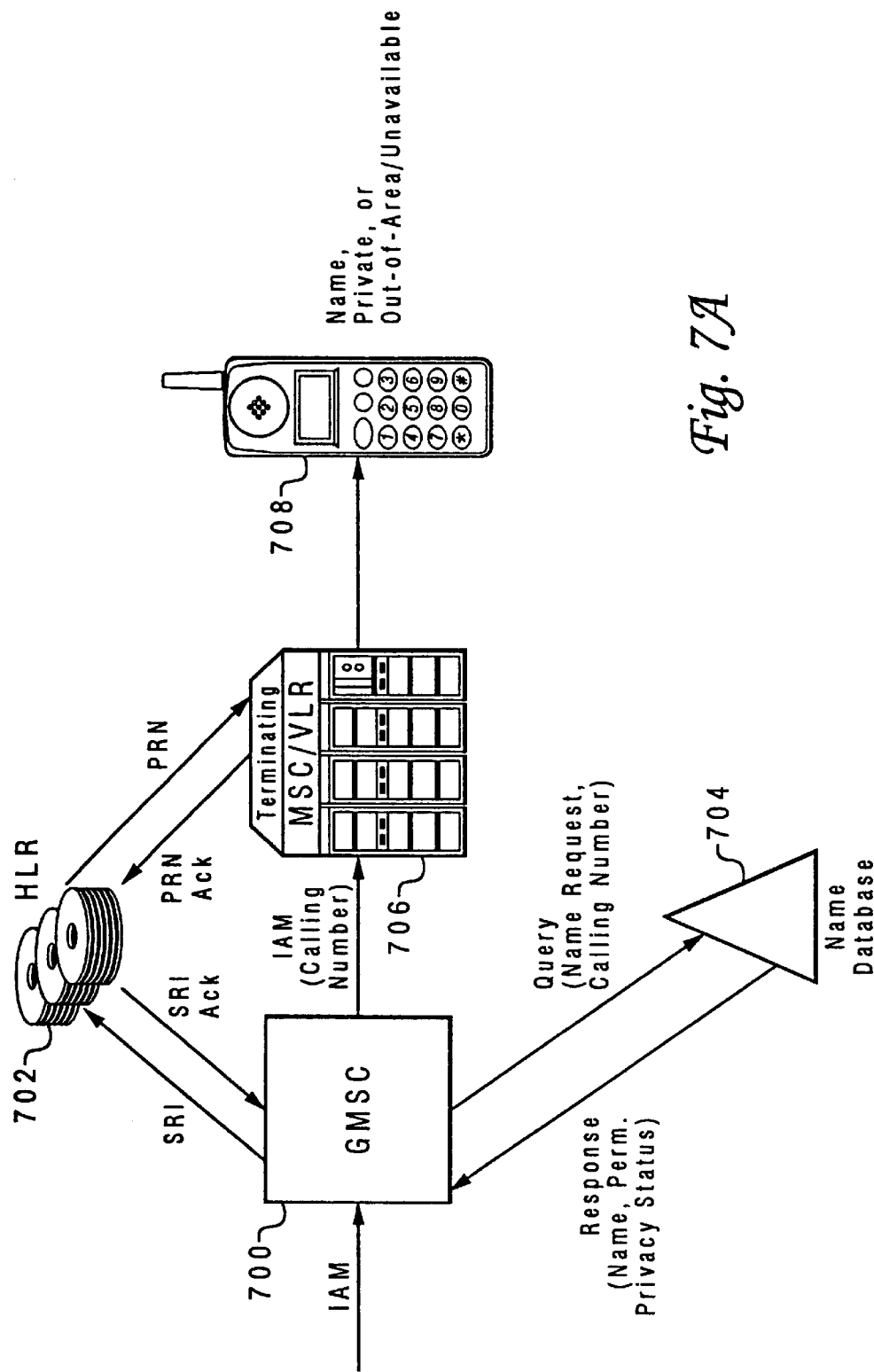

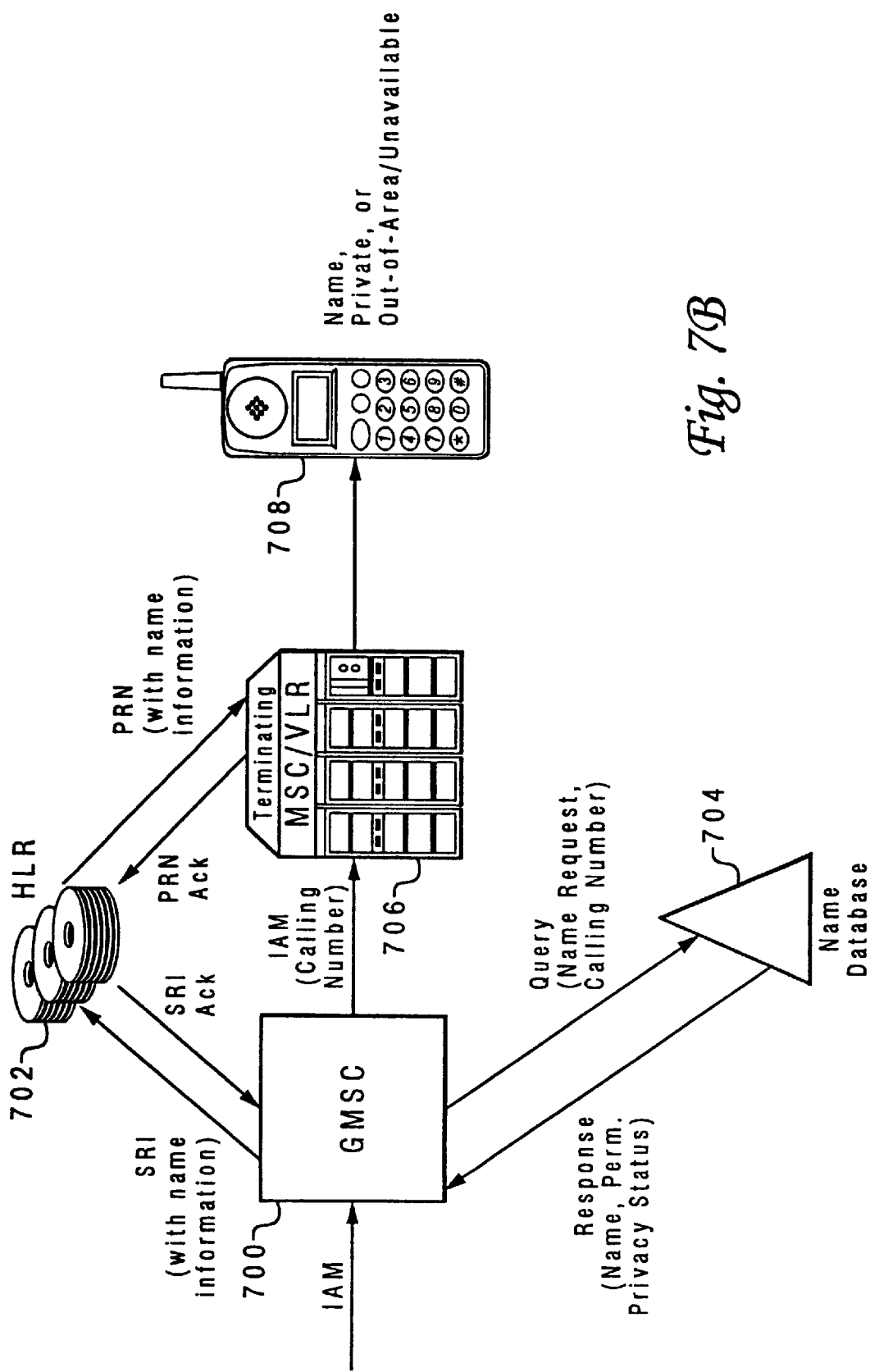

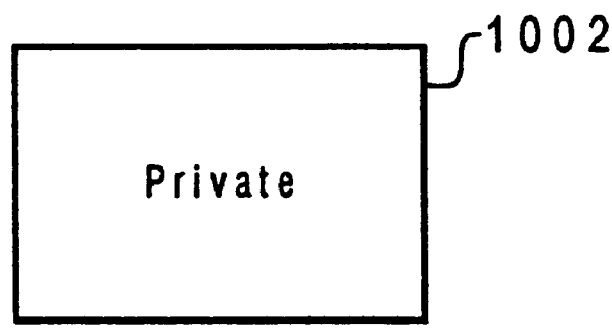
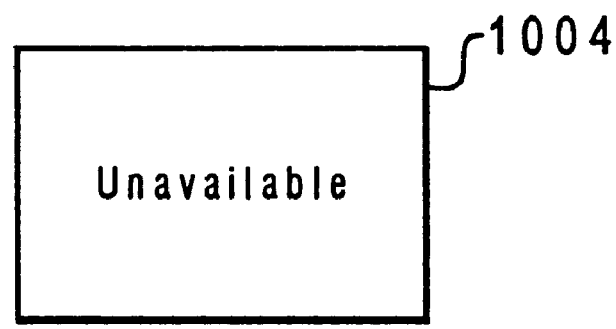
Fig. 10

```
SS-DataTypes {
    iso (2) member-body (16) usa (840) ansi (1) j-std-007-1997 (x)
    modules (3) ss-DataTypes (2) version2 (2) }

DEFINITIONS
IMPLICIT TAGS ::=

BEGIN

-- exports all data types defined in this module

IMPORTS

SS-Code
FROM MAP-SS-Code {
    iso (2) member-body (16) usa (840) ansi (1) j-std-023-1996 (y)
    modules (3) map-SS-Code (15) version2 (2) }

SS-Status, CUG-Index, USSD-String, USSD-DataCodingScheme
FROM MAP-SS-DataTypes {
    iso (2) member-body (16) usa (840) ansi (1) j-std-023-1996 (y)
    modules (3) map-SS-DataTypes (14) version2 (2) }
;
-- data types definition NotifySS-Arg ::= SEQUENCE{
                    ss-Code            [1]    SS-Code OPTIONAL,
                    ss-Status          [4]    SS-Status OPTIONAL,
                    ss-Notification    [5]    SS-Notification OPTIONAL,
                    callIsWaiting-Indicator       [14] NULL OPTIONAL,
                    callOnHold-Indicator   [15]   CallOnHold-Indicator OPTIONAL,
                    mpty-Indicator [16]    NULL OPTIONAL,
                    cug-Index      [17]    CUG-Index OPTIONAL,
                    clirSuppressionRejected       [18] NULL OPTIONAL,
...,
    notifySSExt                [PRIVATE 31] NotifySSExt OPTIONAL }

NotifySSExt ::= SEQUENCE {
    callingName   [0] Name OPTIONAL,
    ...}

Name ::= CHOICE {
    namePresentationAllowed   [0] NameSet,
    presentationRestricted    [1] NULL,
    nameUnavailable           [2] NULL, NameSet ::= SEQUENCE {
    dataCodingScheme [0] USSD-DataCodingScheme,
    lengthInCharacters [1] INTEGER,
    nameString         [2] USSD-String,
    ...}

-- USSD-DataCodingScheme and USSD-String are imported from MAP.
-- The USSD-DataCodingScheme shall be encoded as follows:

-- bit 7 6 5 4 3 2 1 0
--     |       | Alphabet |
--     | 0 0 0 0 |        |
```

*Fig. 13*

METHOD AND APPARATUS FOR DELIVERING AND PRESENTING CALLING NAME INFORMATION IN A WIRELESS COMMUNICATIONS SYSTEM

BACKGROUND OF THE INVENTION

1. Technical Field

The present invention relates generally to a communications system and in particular to a method and apparatus for routing data within the communications system. Still more particularly, the present invention relates to a method and apparatus for delivering and presenting the calling (originating) party's name information to the called (terminating) party's mobile station in a wireless communications system.

2. Description of the Related Art

Many of the present digital telecommunications networks of the world are based on time-division multiple access (TDMA) and use transmission and switching products like digital switches and pulse coded modulation (PCM) transmission at E1 or T1 rates. TDMA users share the radio spectrum in the time domain. An individual user is allocated a time slot and, during this time slot, the user accesses the whole frequency band allocated to the system (wideband TDMA) or only a part of the band (narrow band TDMA). In TDMA, transmission take place in bursts from a mobile station to a base station in an uplink path with only one user transmitting to the base station at any given time. In the downlink path from the base station to the mobile station, the base station usually transmits continuously with the mobile station listening only during the assigned time slot. TDMA channel multiplexes the bids from a number of users. This type of system requires transmission at a higher bit rate over a radio frequency channel.

Another technology that is becoming more widely used is code-division multiple access (CDMA) in a spread spectrum. Spread spectrum techniques spread the bandwidth of the transmitting signal over a spectrum or band of frequency much larger than the minimal band width required to transmit the signal. CDMA has an ability to lock out conflicting signals, which may allow it to share a system with other radio signals without interference.

Wireless technology is an important component of the global information infrastructure. To exploit the full potential of this technology, regulators and administrators of all countries are re-evaluating their spectrum allocation policy. A large segment of the spectrum around two GHz bandwidth has already been released for the use of wireless networks. More spectrum is being allocated by the International Telecommunications Union (ITU) and countries like the United States of America and Canada around the 7–10 GHz range to use wireless technology for broadband wireless applications. Wireless networks are being built all over the world to handle a large volume of traffic and mobility.

With the increased demand for cellular telephones, manufacturers look for new technologies to overcome the problems of poor signals and battery performance. Poor signals resulted in poor performance for the user and a high frequency of false hand offs in the system. Better battery performance was needed to reduce size and costs of hand held units. The size of handsets and better battery performance led to low power designs and performance targets possible only using fully digital technologies. In particular, digital cellular systems based on the global system for mobile communications (GSM) using TDMA have emerged in Europe while systems based on IS-54 using TDMA and IS-95 using CDMA are being developed in the United States.

With current PCS 1900 systems and other GSM based systems, a communication for providing calling party name information is not available. Although North American Wire Line Systems have name delivery, no such system is currently available for wireless communications systems, in particular GSM based systems including PCS 1900. Wireless communications systems have an added difficulty in presenting calling party name information because this information must be transported over an air interface to the mobile station. Some existing mobile stations allow user to store name characters next to known phone numbers in the mobile system. In response to incoming calls, the mobile station will display the name associated with the received number. This system of presenting calling party name information, however, works only for known names and numbers entered by a user into the mobile station.

Therefore, it would be advantageous to provide an improved method and apparatus for delivering and presenting calling party name information to mobile station customers.

SUMMARY OF THE INVENTION

The present invention provides a method and apparatus in a wireless communications system for presenting a calling party name to a mobile station within the wireless communications system. A communications signal is received from a network to initiate a call to a mobile station within the wireless communications system. Next, a determination is made as to whether mobile station is provisioned to receive calling party names in response to receiving the communications signal. A calling party name is identified using a database located within the wireless communications system in response to determining that the mobile station is provisioned to receive calling party names. Then, the calling party name is sent to the mobile station over the air interface in response to identifying the calling party name.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 is a message flow diagram depicting how the terminating MSC knows how to query the name database, and when the MSC queries the name database according to the present invention;

FIG. 7A and 7B are diagrams of components in a cellular system used in a calling name presentation (CNAP) query at a Gateway MSC according to the present invention;

FIG. 10 is a diagram illustrating possible CNAP displays for a mobile station according to the present invention;

FIG. 13 is a diagram illustrating the definition of an optional extension, notifySSExt within a NotifySS argument according to the present invention;

DETAILED DESCRIPTION

Figure 1:
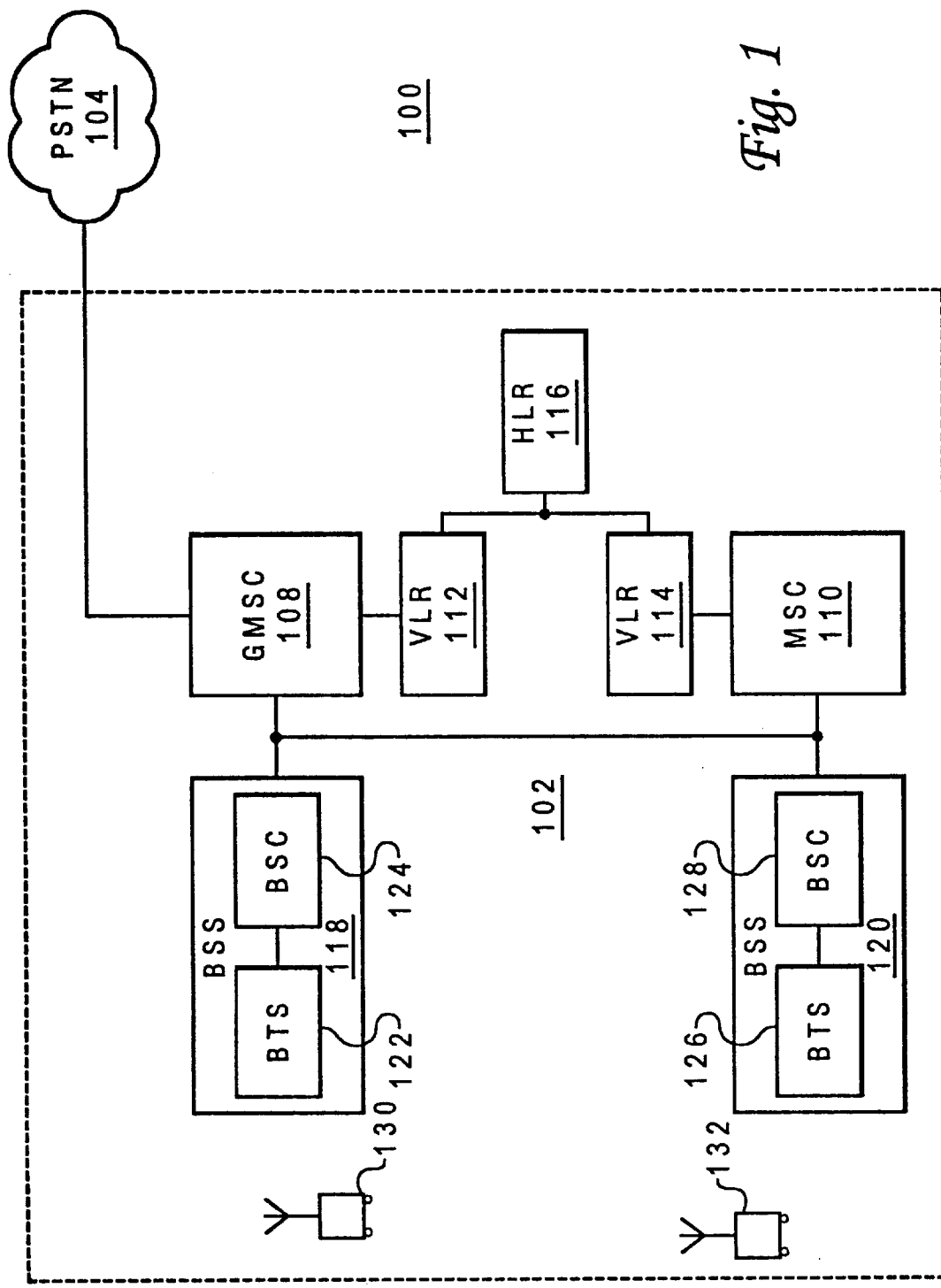
FIG. 1 is a block diagram of a communications system in which the present invention may be implemented.

With reference now to the figures and in particular with reference to FIG. 1, a block diagram of a communications system is illustrated in which the present invention may be implemented. Communications system 100 includes a wireless communications system in the form of cellular system 102. In addition, also depicted in communications system 100 is a public switched telephone network (PSTN) 104. Cellular system 102 is a TDMA wireless communications system in the depicted example. More specifically, cellular system 102 is a GSM system, such as a PCS 1900 system in the United States.

Cellular system 102 includes a mobile switching center (MSC) 108 and 110, which have connections to visitor location registers 112 and 114 and home location register 116. Additionally, communications system 102 also includes base station systems (BSS)s 118 and 120. BSS 118 includes a base transceiver station (BTS) 122 and a base station controller (BSC) 124. Similarly, BSS 120 includes a BTS 126 and a BSC 128. Also illustrated in FIG. 1 are communications units in the form of mobile stations 130 and 132. Mobile stations 130 and 132 may be, for example, a handheld cellular phone. MSC 108 is coupled to PSTN 104.

MSC 108 performs switching of a call from PSTN 104 to mobile communications units within wireless communications system 102. MSC 108 and 110 also validates subscriber mobile stations to determine if the subscriber is a resident of the system or a roamer by using visitor location register (VLR) 112, VLR 114, and home location register (HLR) 116. VLR 112 and 114 is a functional unit that dynamically stores subscriber information, such as location area, when the subscriber is located in the area covered by a particular VLR. When a roaming mobile station enters an area controlled by an MSC, the MSC informs the associated VLR about the mobile station and initiates a registration procedure for the mobile station. HLR 116 is a functional unit used for management of mobile subscribers. Subscriber information and the part of the mobile information to allow incoming calls to be routed to the MSC for a particular mobile station are stored within HLR 116. For example, VLR address, mobile station, ISDN number, and subscriber data are information stored within HLR 116. MSC 108 and 110 perform the necessary switching functions from mobile stations located within a geographic area associated with a particular MSC, called an MSC area. The MSCs monitor the mobility of its subscribers and manages necessary resources needed to handle and update location registration procedures and carry out handoff functions. Although, in the depicted example, only two MSCs are illustrated in cellular system 102, other numbers of MSCs may be employed depending on the communications system. Also, in FIG. 1, MSC 108 may function as a gateway MSC (GMSC).

BSS 118 and 120 are the physical equipment providing radio coverage to a defined geographical areas called cells. BSS 118 and 120 contain the hardware necessary to communicate with mobile stations 130 and 132. BSC 124 and BSC 128 and BSS 118 and 120, respectively perform a control function while BTS 122 and BTS 126 perform the transmitting function. The BTSs are the radio transmission equipment and are employed to cover each cell. A BSS can cover several cells using multiple BTSs. BTS 122 and BTS 126 each contain a transcoder rate adopter unit (TRAU) (not shown), which provides GSM's specific speech and coding and decoding processes as well as rate adaptation functions for data. Although the depicted example is a GSM system, the present invention may be implemented in other types of wireless communications system, such as, for example, a wireless system under IS-95 (CDMA) or Japanese Digital Cellular Standards. Although the following description of signaling for interconnection between MSCs and a PSTN in the present invention is in the context of SS7 ISUP, an ANSI SS7 standard, the present invention may be applied to other forms of signaling, such as ISDN or MF-FGD. Additionally, the depicted examples below employ GSM messages in a GSM system for wireless technologies, the present invention also may be applied to other wireless technologies (CDMA, TDMA, and AMPS), which use IS-41.

Figure 2:
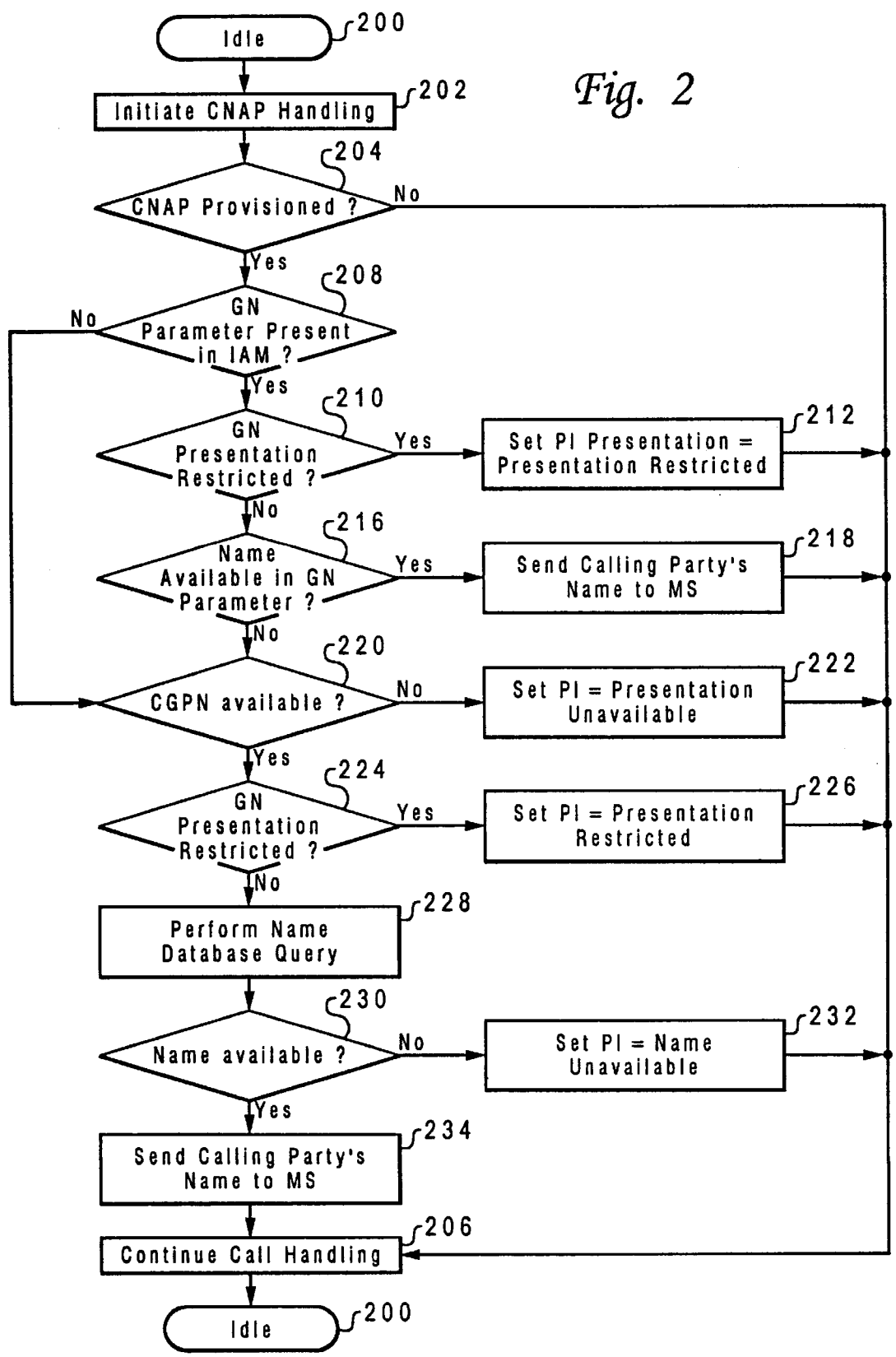
FIG. 2 is a flowchart of a process for delivering and presenting calling party name information to a mobile station according to the present invention.

The present invention provides a method and apparatus for transporting calling party name information to a mobile station within a cellular system. Turning now to FIG. 2, a flowchart of a process for delivering and presenting calling party name information to a mobile station is depicted according to the present invention. This process may be implemented in a MSC within a cellular system. This process performs database queries at the MSC handling the call to the called (terminating) party's mobile station. The delivery of calling party name information is part of a supplementary service offered to the called party and is referred to as calling name presentation (CNAP).

The process begins in an idle state (step 200). Thereafter, in response to an incoming call, CNAP handling is initiated (step 202). A determination is made as to whether CNAP is provisioned for the called party (step 204). If CNAP is not provisioned, the process then proceeds to continue with normal call handling (step 206) with the process then returning to an idle state back in step 200. If CNAP is provisioned, a determination is then made as to whether a generic name (GN) parameter is present in the IAM (step 208). If the GN parameter is present, a determination is made as to whether GN presentation is restricted (step 210). If the GN presentation is restricted, the process then sets a presentation indicator variable (PI) equal to presentation restriction (step 212). Thereafter, the process continues to step 206 as described previously. On the other hand, if GN presentation is not restricted, a determination is made as to whether the name is available in the GN parameter (step 216). If the name is available, the process then sends the calling party's name to the mobile station (step 218) with the process then proceeding to step 206. Otherwise, the process determines whether the calling party number (CGPN) is available (step 220). The CGPN is employed to perform a name database query. If the call is an inter-MSC call, then the CGPN is available in an incoming IAM. The process also proceeds to make this determination directly from step 208 if the GN parameter is not present in the IAM.

If the CGPN is not available, the process then sets the variable PI equal to presentation unavailable (step 222) with the process then proceeding to step 206. Otherwise, a determination is made as to whether the CGPN is restricted (step 224). The CGPN is restricted if the calling party has a calling line identification restriction (CLIR) feature. If the CGPN presentation is restricted, the process then sets the variable PI equal to presentation restricted (step 226) with the process then proceeding to step 206 as described above.

If on the other hand, CGPN presentation is not restricted, then a name database query is performed (step 228). The process then determines whether a name is available in response to the database query (step 230). If a name is not available, the process then sets the variable PI equal to name unavailable (step 232) with the process then proceeding to step 206 as previously described. If the name is available, the process then sends the calling party's name to the called mobile station (step 234) with the process then proceeding to step 206 to continue call handling and then returning to an idle state in step 200.

Figure 3:
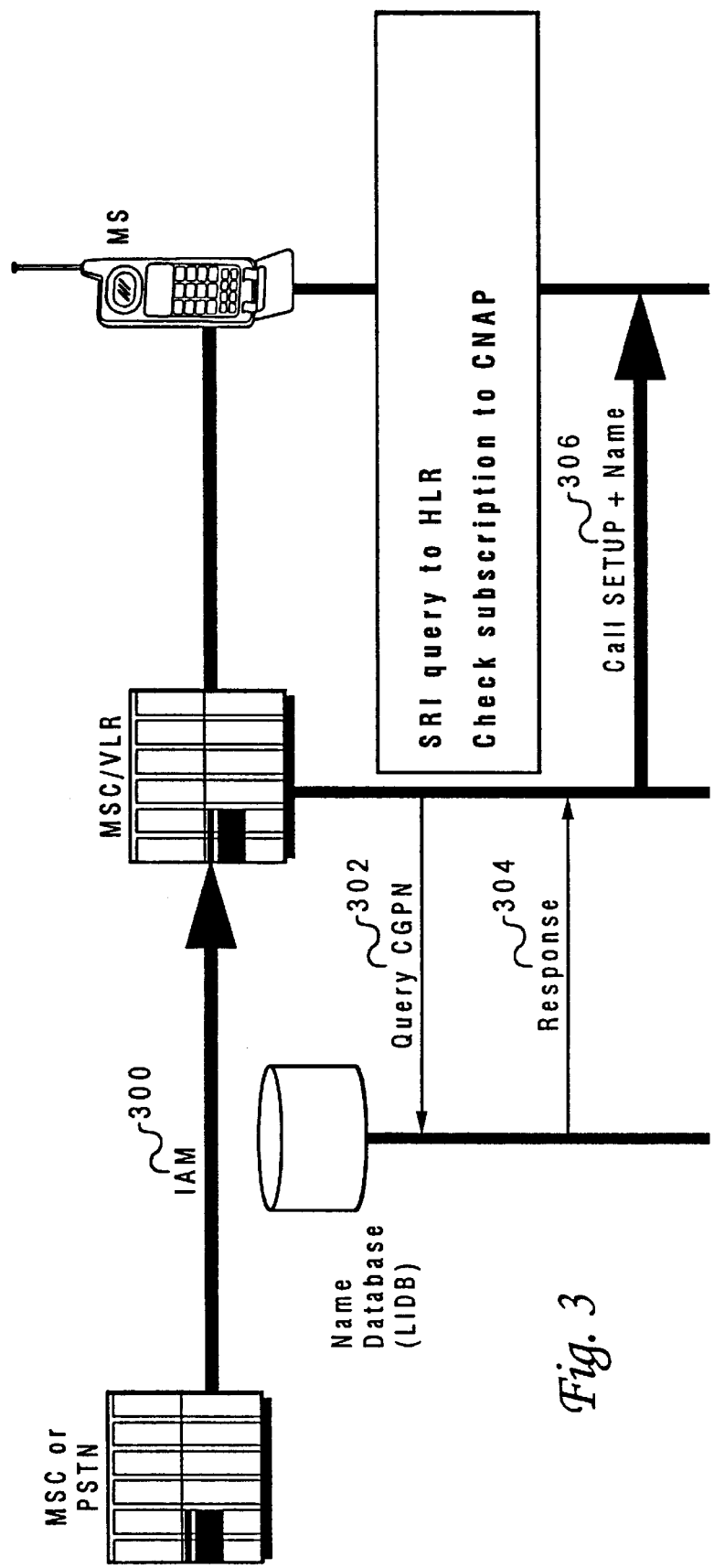
FIG. 3 is a diagram of message flow used to perform a terminating query according to the present invention.

Turning now to FIG. 3, a diagram of message flow used to perform a terminating query is depicted according to the present invention. A MSC or PSTN sends an initial address message (IAM) to the terminating MSC (step 300). The terminating MSC queries a name database using the calling party number (step 302). The query is sent to a name database in the depicted example. In addition, before sending the query, the MSC may check to determine whether the mobiles station customer has a subscription for CNAP. A response is received by the MSC in response to the query of the name database (step 304). The MSC then sends a call Setup message plus the calling party's name, if any, is received in response to the query, to the name database (step 306).

Figure 4:
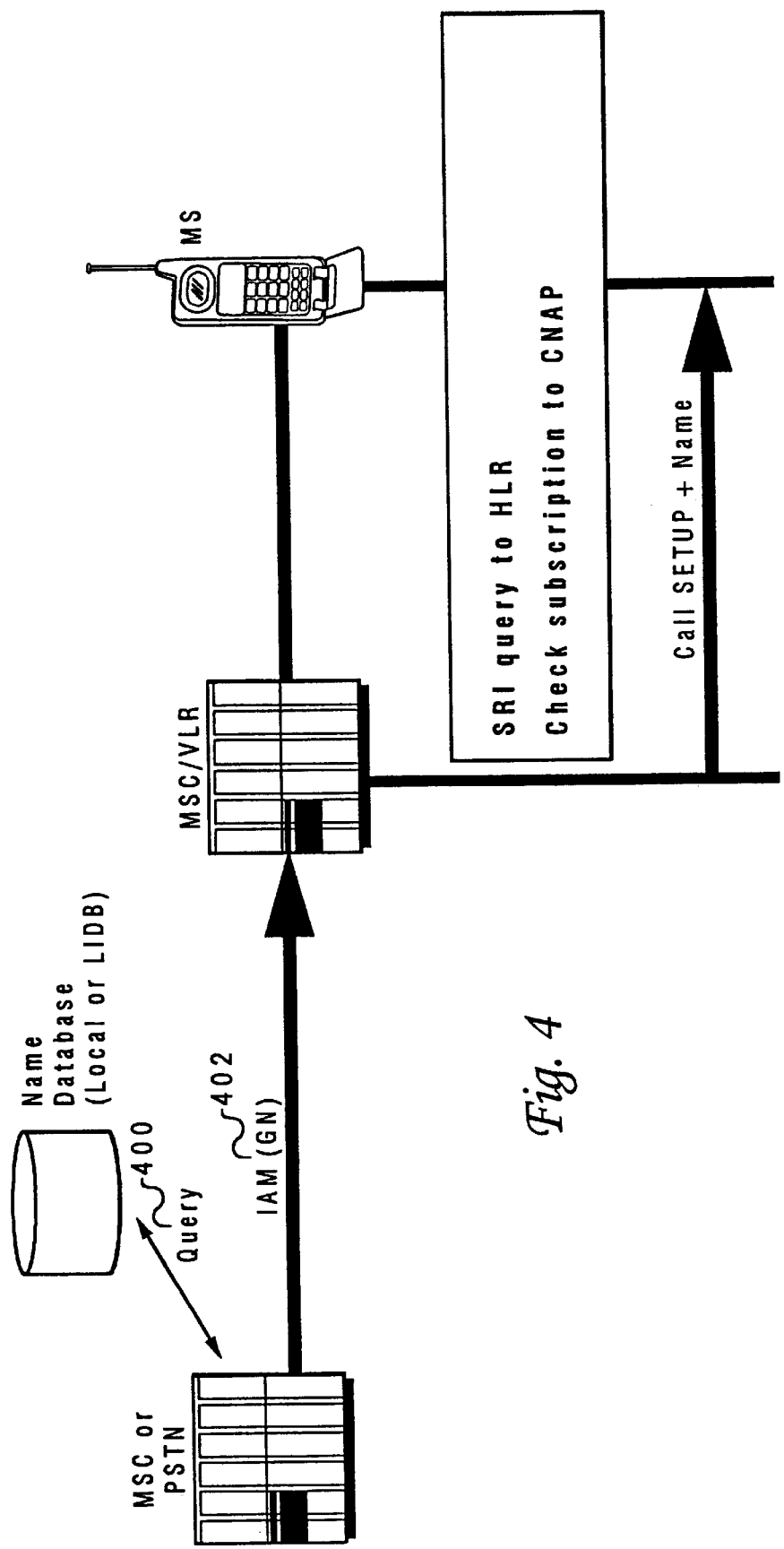
FIG. 4 is a diagram of message flow used to perform an originating query according to the present invention.

With reference next to FIG. 4, a diagram of message flow used to perform an originating query is depicted according to the present invention. In this instance, the originating MSC or PSTN queries a name database (step 400). This name database may be a local database using the calling party number in the MSC/VLR or PSTN. The name information received in the response from the name database is sent to the terminating MSC within the GN parameter of the IAM. Additionally, the terminating MSC checks to see whether the mobile station subscriber has a subscription to CNAP. If the mobile station subscriber does not have a subscription to CNAP, name information is not sent to the mobile station. The MSC sends a call Setup message plus name information to the called party's mobile station.

Figure 5:
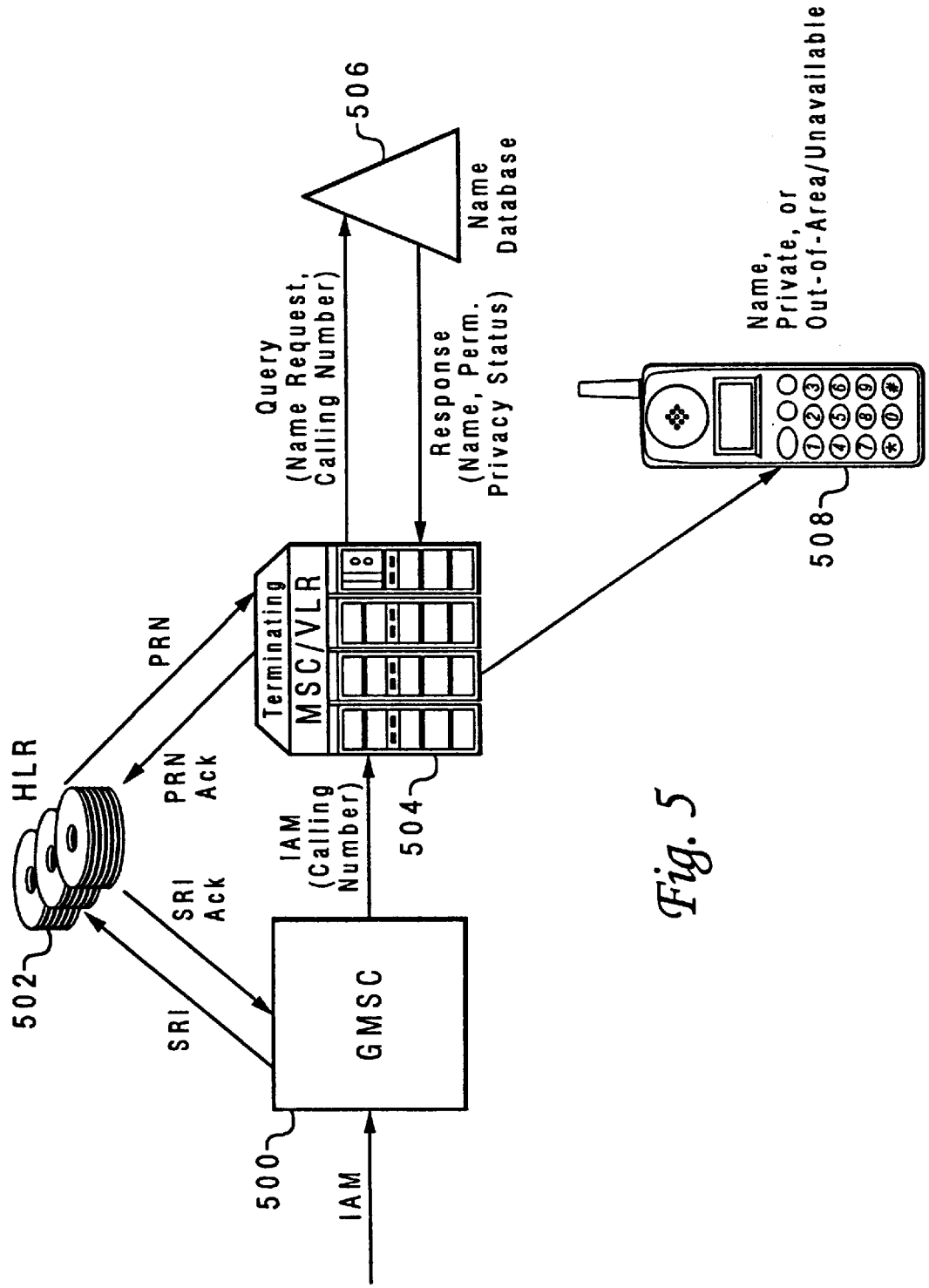
FIG. 5 is a block diagram of components used in performing a query at the terminating mobile service center (MSC) according to the present invention.

With reference now to FIG. 5, a block diagram of components used in performing a query at the terminating MSC is depicted according to the present invention. Gateway MSC (GMSC) 500 receives a IAM from another MSC or PSTN. The IAM includes the calling party number. In response to receiving the IAM, GMSC 500 sends a send routing information (SRI) message to HLR 502, which in turn sends a Provide Roaming Number (PRN) message to terminating MSC/VLR 504. In response, a Provide Roaming Number ACK message is returned to HLR 502, which in turns sends a SRI acknowledge message back to GMSC 500.

When the SRI acknowledgement message is received, GMSC 500 then sends an IAM message to terminating MSC/VLR 504. This IAM includes the calling number parameter.

Terminating MSC/VLR 504 then sends a query to name database 506 to request a name for the calling number. Name database 506 provides a response to terminating MSC/VLR 504. The response from name database 506 includes the name if available and an indication of some privacy status. Terminating MSC/VLR 504 sends a call Setup message to mobile station 508. The information in the Setup message may be the name of the calling party or an indication that the name is private or out of area/unavailable.

With reference next to FIG. 6, a diagram of a message flow depicts how the terminating MSC knows how to query the name database, and when the MSC queries the name database according to the present invention. The terminating MSC receives an IAM from the GMSC (step 600) and sends a Send Info for Incoming Call (Send information I/C) message to the VLR (step 602). The VLR responds with a page request, Page Req message (step 604), which is enhanced to include CNAP subscription information.

In response to receiving the page request message, the MSC analyzes the data received in the IAM. For example, the MSC determines whether name delivery is restricted by the calling party. The MSC also analyzes the CNAP subscription information received from the VLR. CNAP subscription information is sent by the HLR in an ISD message to the VLR during a location update procedure. For example, the MSC determines whether the called party has a subscription to the CNAP service. This analysis is performed to determine whether to initiate a CNAP query to the name database. The MSC initiates a query to the name database at the same time or prior to sending a paging command, Paging Cmd, message in step 606. Upon receiving a response from the name database, the MSC analyzes the name information and transmits the appropriate information to the mobile station in the Setup message (step 608). FIG. 6 illustrates other messages sent between the various components in a GSM system, but are not described in detail because they are defined by known standards for GSM systems.

In the example above, the CNAP query is made to a name database associated with the MSC handling the call to the mobile station. Alternatively, the query may be made using different means than the one depicted above. For example, the query may be made at the Gateway MSC, at the HLR, or at the originating network. Turning now to FIG. 7A, a diagram of components in a cellular system used in a CNAP query at a gateway MSC (GMSC) is depicted according to the present invention. In response to receiving an IAM from the originating network, GMSC 700, sends an SRI message to HLR 702, which in turn responds with a SRI acknowledgement message. GMSC 700 initiates a query to name database 704 after receiving the SRI acknowledgment message from HLR 702, assuming that the SRI acknowledgement message is enhanced to include CNAP subscription information. The query includes a name request for the calling number. Name database 704 returns a response including a name and an indication of privacy status.

Alternatively, GMSC 700 may initiate the query for all cause at the same time an SRI message is sent to HLR 702. Upon receiving a response from name database 704, an IAM message is sent to terminating MSC/VLR 706 in which the IAM includes the generic name (GN) parameter and the calling number parameter. Terminating MSC/VLR sends the appropriate calling name information to mobile station 708.

In FIG. 7B, a query is first made to name database 704 after GMSC 700 receives an IAM, rather than sending an SRI to HLR 702. After receiving a response, then GMSC 700 sends an SRI message including name information to HLR 702. A PRN message including the name information is then sent to MSC/VLR 706. In response, MSC/VLR 706 returns a PRN ACK message to HLR 702 with HLR 702 then responding by sending an SRI ACK message back to GMSC 700. Then, GMSC 700 sends an IAM to MSC/VLR 706 with the appropriate calling name information then being sent to mobile station 708.

Figure 8:
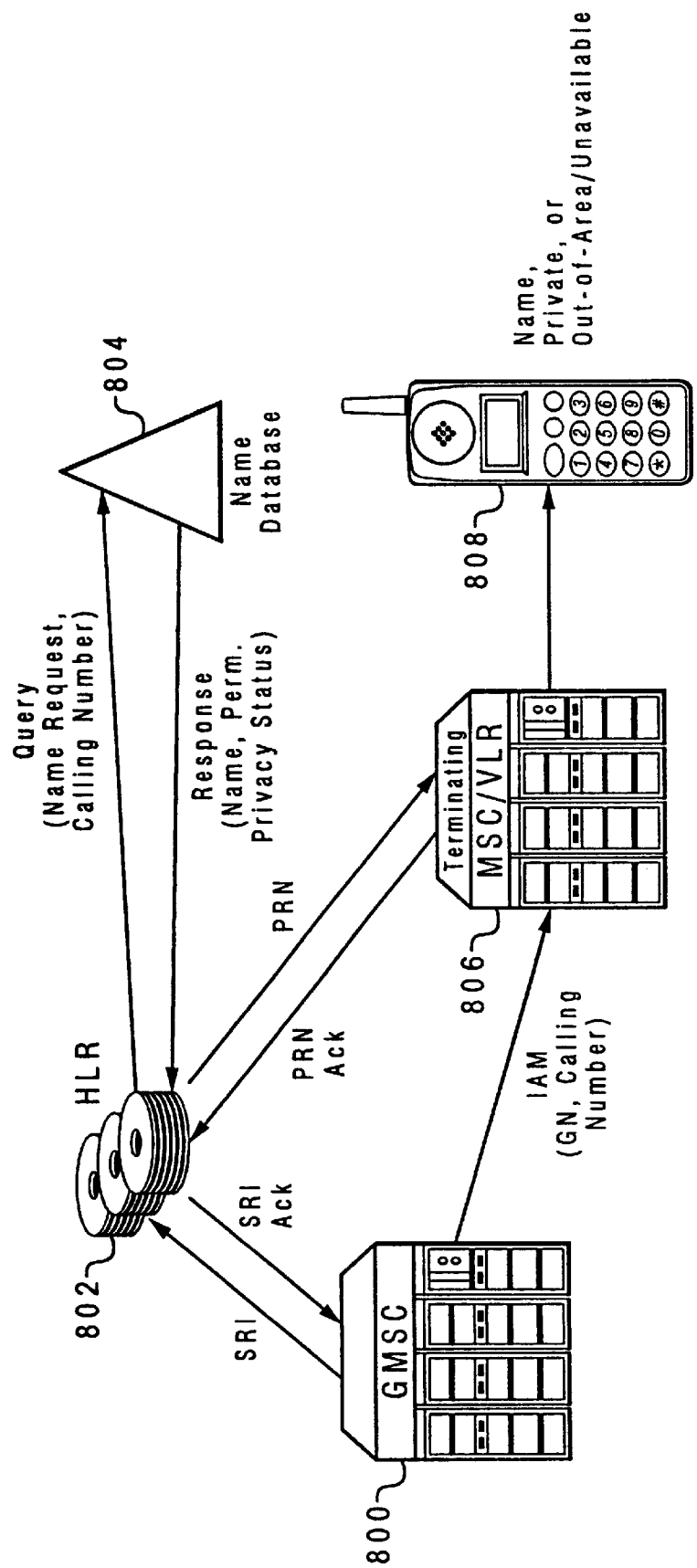
FIG. 8 is a diagram of components in a cellular system used in CNAP query at terminating HLR according to the present invention.

In FIG. 8, a diagram of components in a cellular system used in CNAP query at terminating HLR is depicted according to the present invention. In this instance, the HLR is used to initiate a CNAP query to a name database. In response to receiving an SRI message from GMSC 800, HLR 802 sends a Query message to name database 804 including a name request and the calling number. A response is received from name database 804. Additionally, HLR sends a PRN message to terminating MSC/VLR 806 and receives an acknowledgment to that message. Upon receiving a PRN acknowledgment message, HLR 802 sends an SRI acknowledgement message to GSM 800. This message also includes information resulting from the query of name database 804. GMS 800 then sends an IAM to terminating MSC/VLR 806 in which the IAM includes a generic name (GN) parameter and a calling number parameter. Terminating MSC/VLR 806 sends the appropriate calling name information to mobile station 808.

Figure 9:
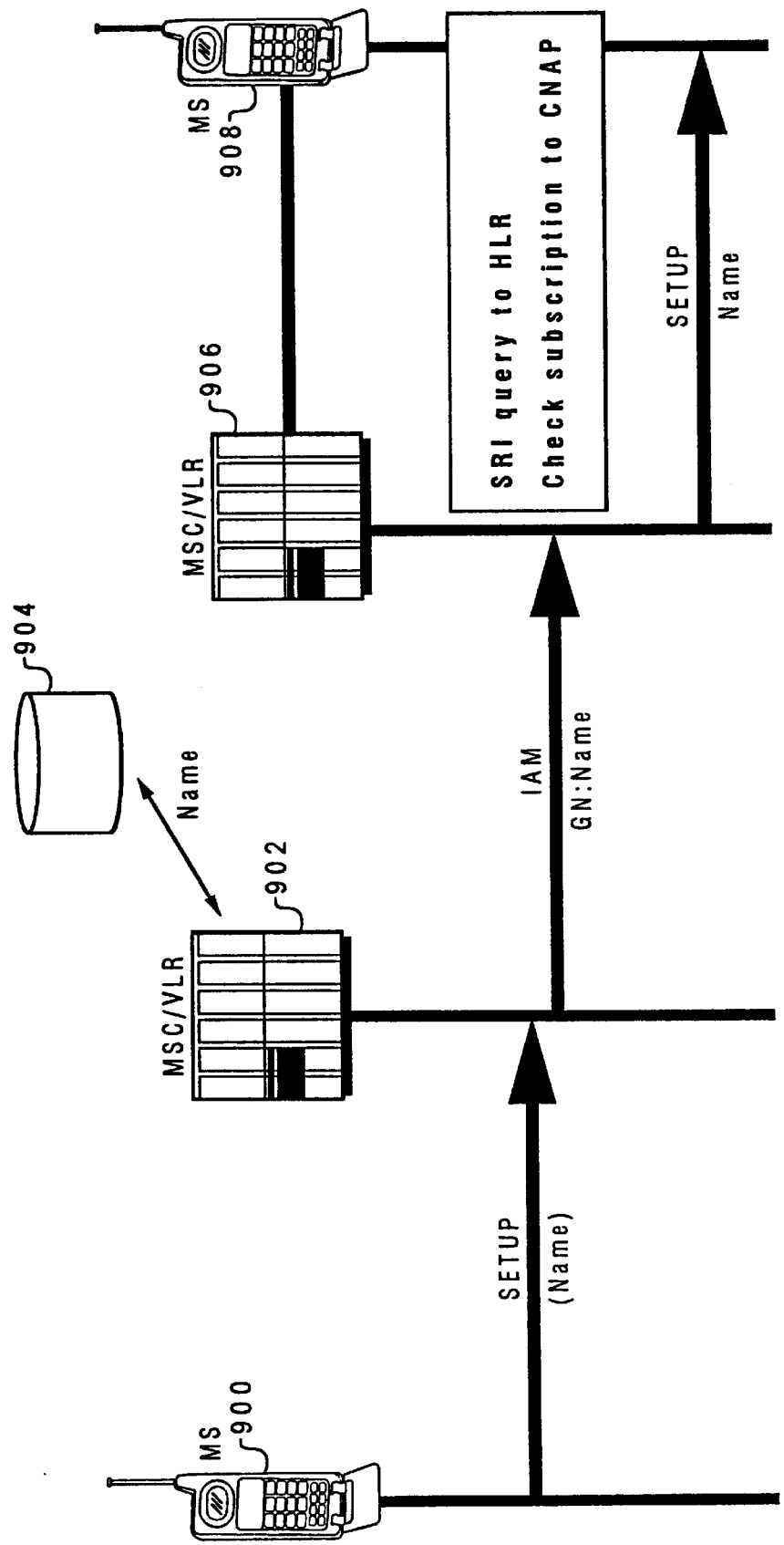
FIG. 9 is a diagram of components used in a CNAP query at an originating network according to the present invention.

Turning now to FIG. 9, a diagram of components used in a CNAP query at an originating network is depicted according to the present invention. In this example, mobile station 900 sends a Setup message to a MSC/VLR 902 in the originating network. The MSC or VLR in MSC/VLR 902 may query the calling party's HLR (not shown) to obtain a name for the calling party. Additionally, this name information may be available within the VLR in MSC/VLR 902. Alternatively, MSC/VLR 902 queries database 904 for name information. In either case, MSC/VLR 902 sends the name information in an IAM to terminating MSC/VLR 906 in a GN parameter within the IAM. An additional option involves mobile station 900 storing name information that is stored within a subscriber identity module (SIM) with this information being sent to MSC/VLR 902 in the Setup message. Terminating MSC/VLR 906 queries the VLR (not shown) to check subscription to CNAP. If subscribed to CNAP, a Setup message is sent to mobile station 908 including name information.

With reference next to FIG. 10, a diagram illustrating possible CNAP displays for a mobile station is depicted according to the present invention. Display 1000 shows a calling party's name at the mobile station. The amount of information displayed is n characters with being set by the particular cellular system. Display 1002 shows the text "private", which is displayed if the calling party's name has a presentation indication variable, PI, set equal to presentation restricted. Display 1003 shows the text "unavailable", which is displayed at the mobile station if the calling party's name has a presentation indication variable set equal to presentation unavailable. This situation typically occurs if the calling party's number is not available or a match is not found in the name database.

Figure 11:
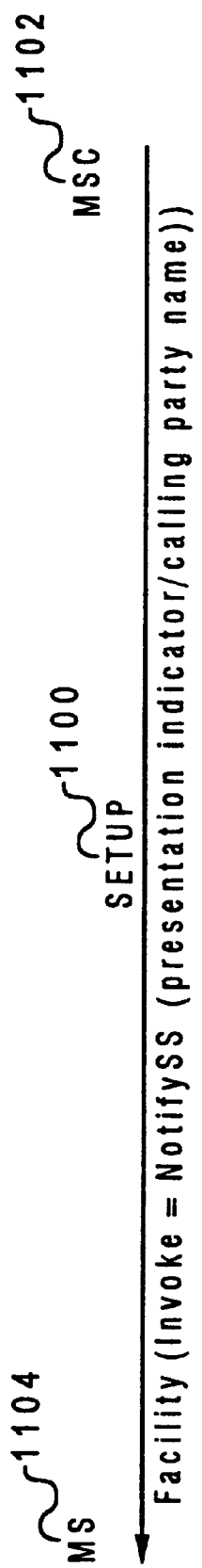
FIGS. 11 and 12 are diagrams illustrating sending of information to a called CNAP subscriber's mobile station according to the present invention.
Figure 12:
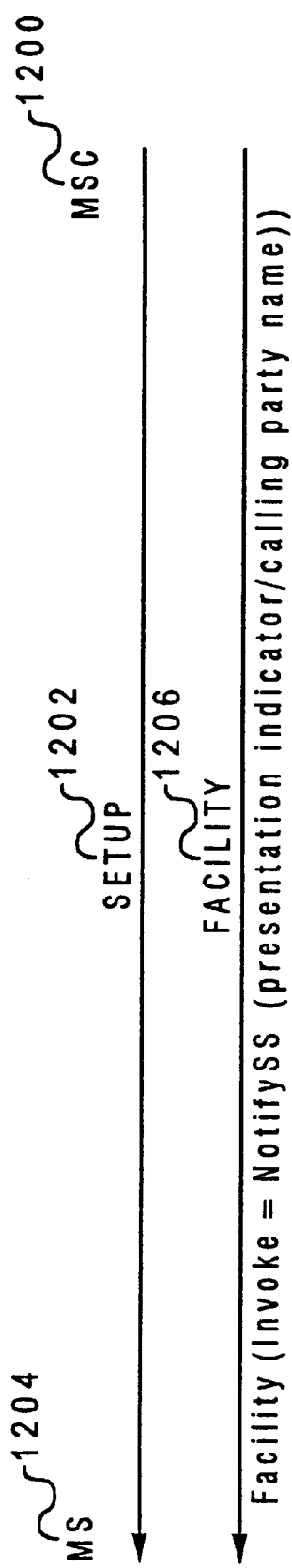

Turning now to FIGS. 11 and 12, diagrams illustrating sending of information to a called CNAP subscriber's mobile station are depicted according to the present invention. A response is returned to the MSC. If the response is received in time to include the name in a Setup message, then the Setup message is sent to the mobile station with the name information. Otherwise, name information is sent to mobile station in a facility message after the Setup message, but before a Connect message is sent. In FIG. 11, Setup message 1100 is sent from MSC 1102 to mobile station 1104. The calling name presentation information is sent within the Facility IE of Setup message 1100. In FIG. 12, MSC 1200 first sends a Setup message 1202 to mobile station 1204. Thereafter, separate message, a Facility IE in Facility message 1206 is sent from MSC 1200 to mobile station 1204.

With reference next to FIG. 13, a diagram illustrating the definition of an optional extension, notifySSExt within the NotifySS argument is depicted according to the present invention. This optional extension, notifySSext is used to provide the CNAP information in the Facility IE of the Setup or Facility message. This example employs USSD data coding data scheme for the transmission of the calling party name to the called party's mobile station.

Figure 14:
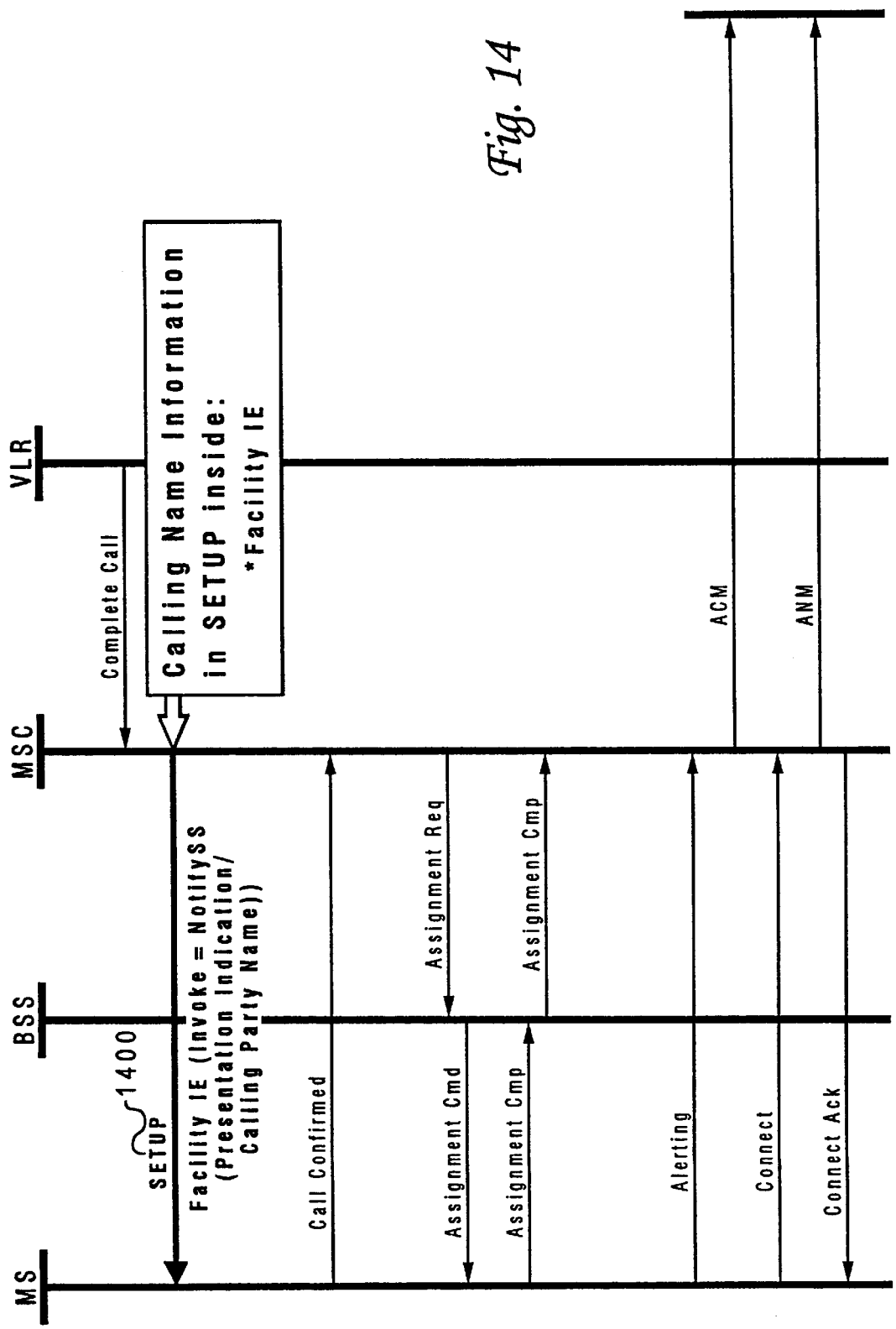
FIGS. 14–19 illustrate message flows used in providing name delivery to a mobile station according to the present invention.
Figure 15:
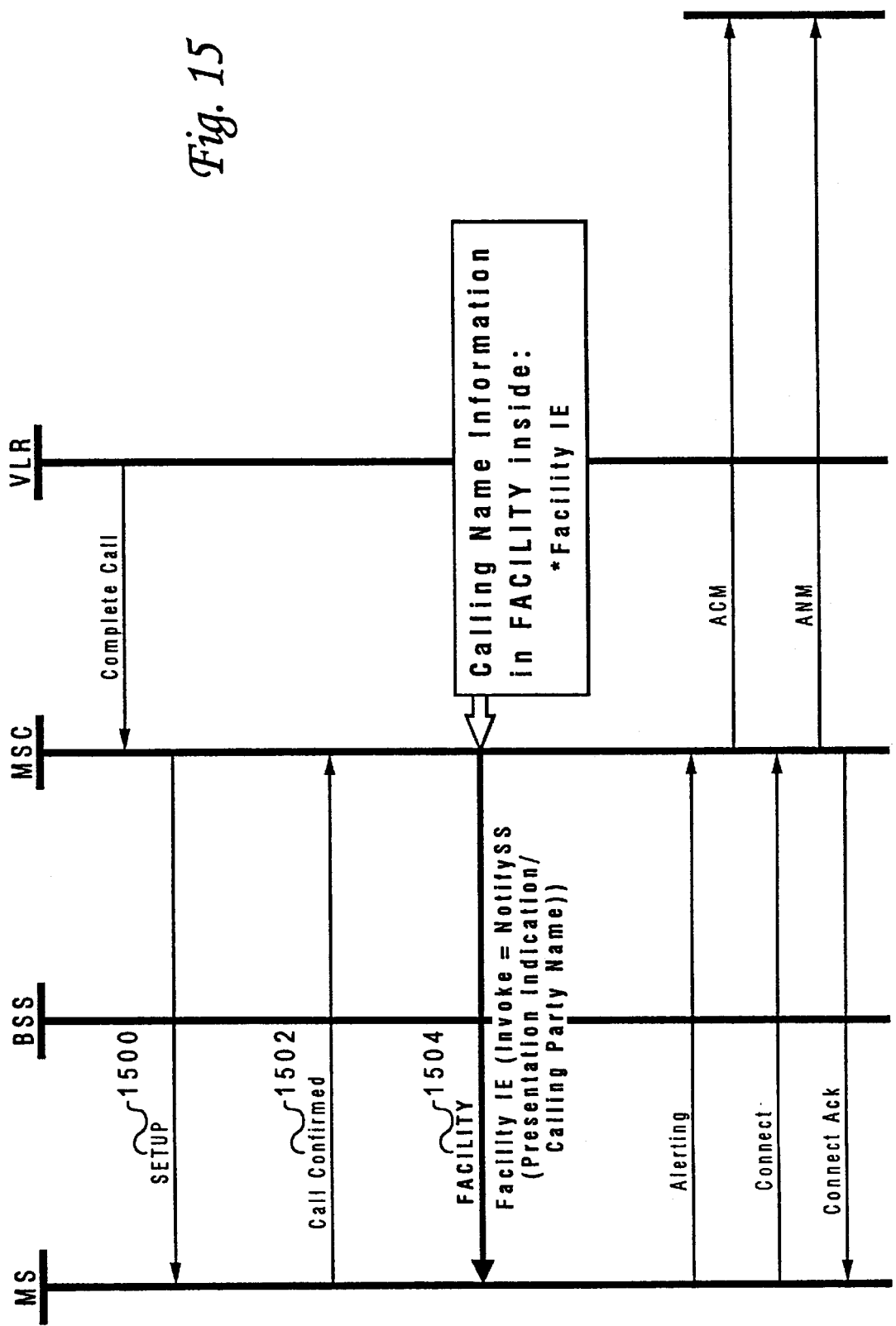

FIGS. 14–19 illustrate message flows used in providing name delivery to a mobile station. In FIG. 14, a Setup message is sent including calling information within a Facility IE message located within the Setup message (step 1400). In FIG. 15, a Setup message is sent to the mobile station without any calling party name information (step 1500). The MSC sends a Facility message that contains a Facility IE (step 1504). This message includes the calling name information. In both FIGS. 14 and 15, the message is the following form: Facility IE (Invoke =NotifySS (Presentation Indication/Calling Party Name)). Additionally, both FIGS. 14 and 15 also include other messages shown to provide a reference for the Setup message and the Facility message.

Figure 16:
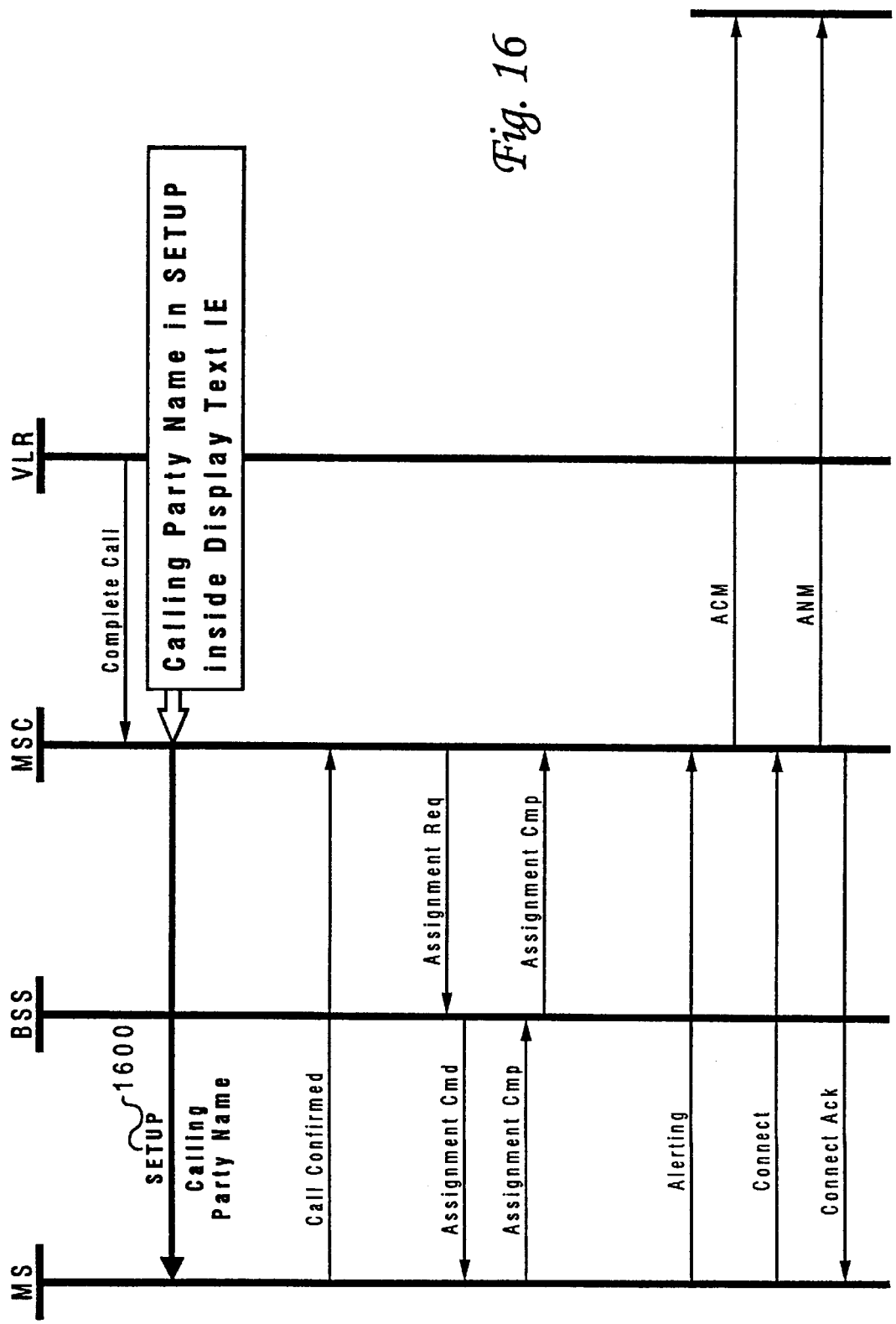
Figure 17:
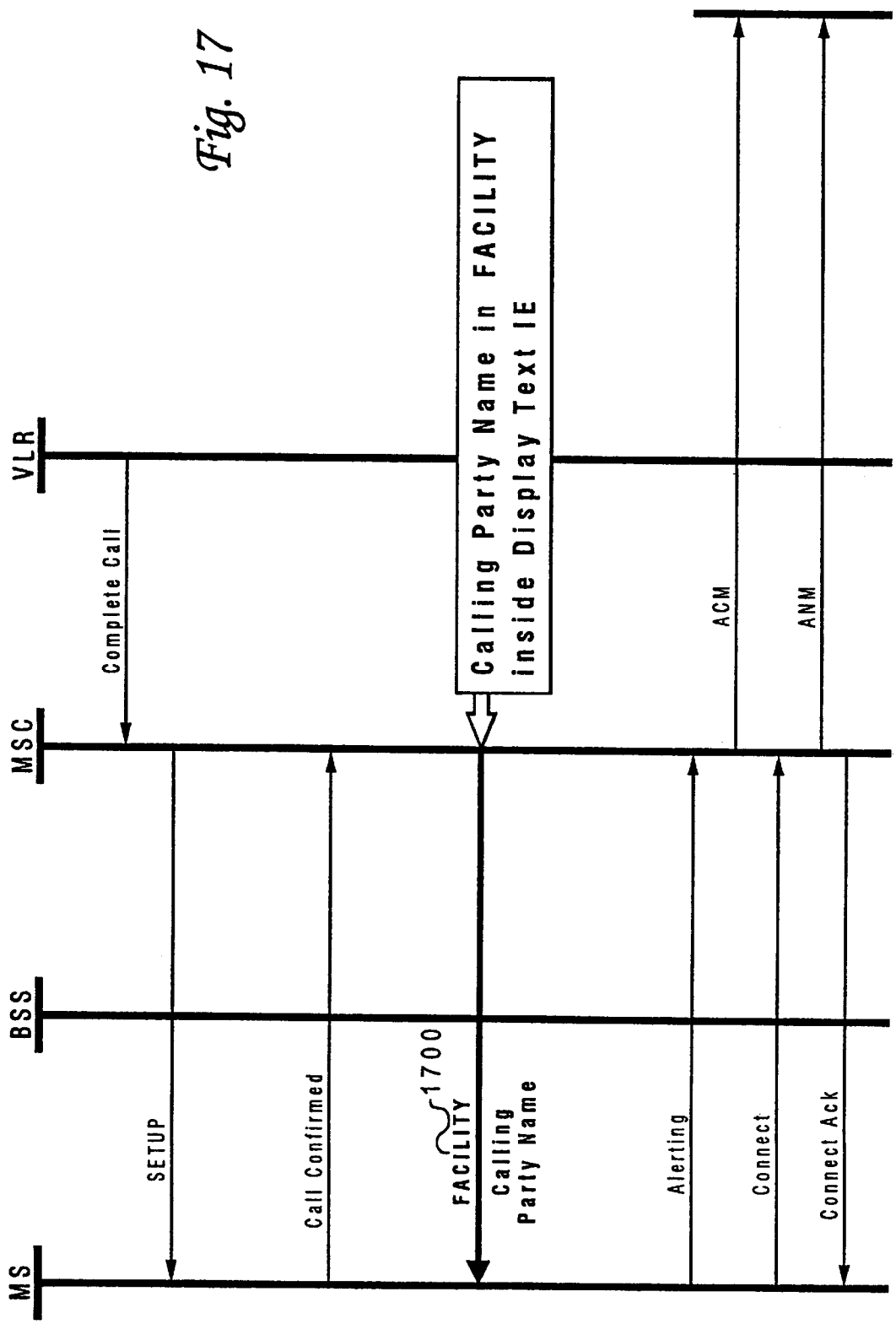

In FIG. 16, the calling party name is sent with the Setup message from the MSC to the mobile station (step 1600). The calling party name is sent within the Display Text IE of the Setup message. In FIG. 17, the calling name party is sent within the Facility message from the MSC to the mobile station (step 1700). As with the Setup message, the calling party name is contained within the Display Text IE.

Figure 18:
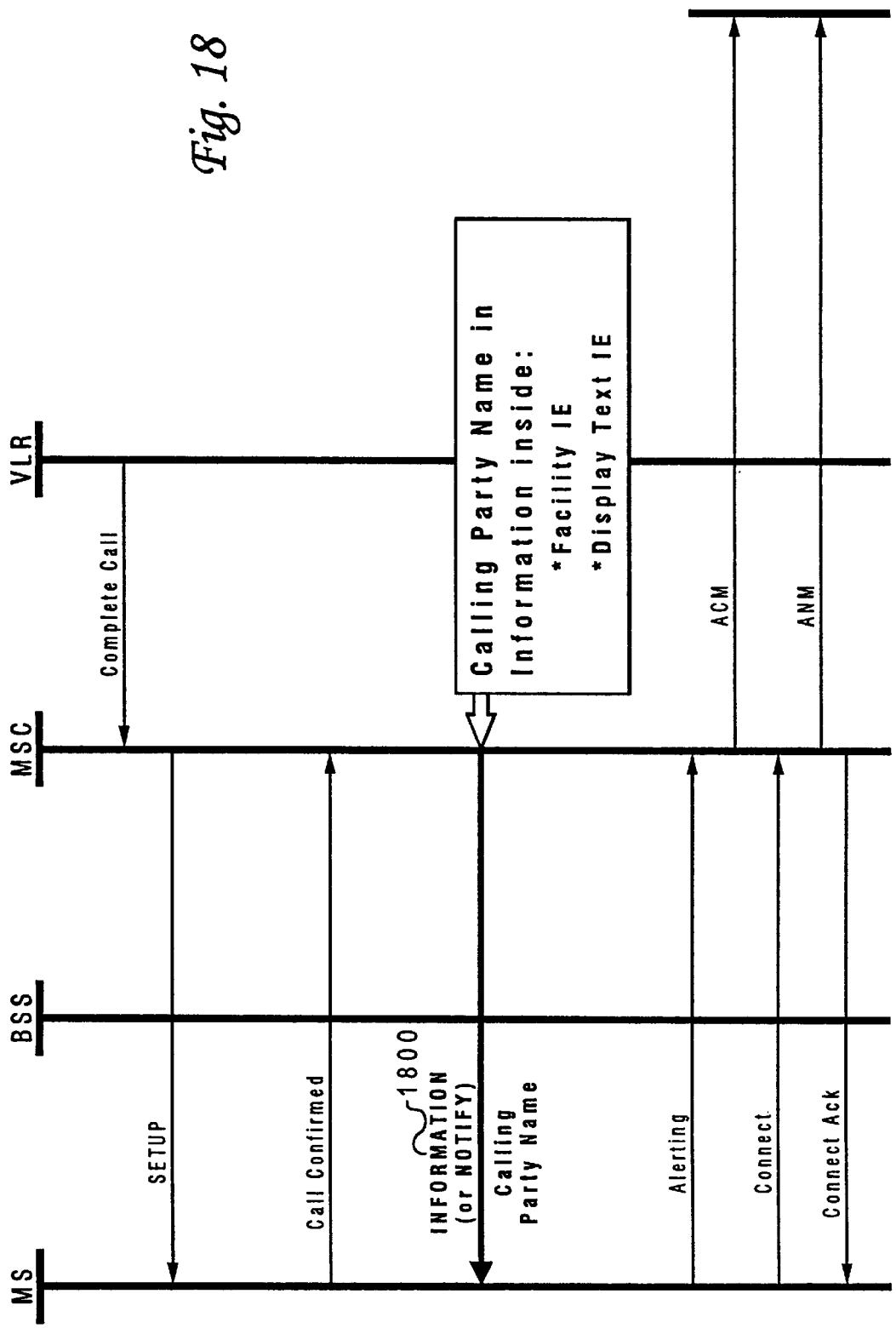
Figure 19:
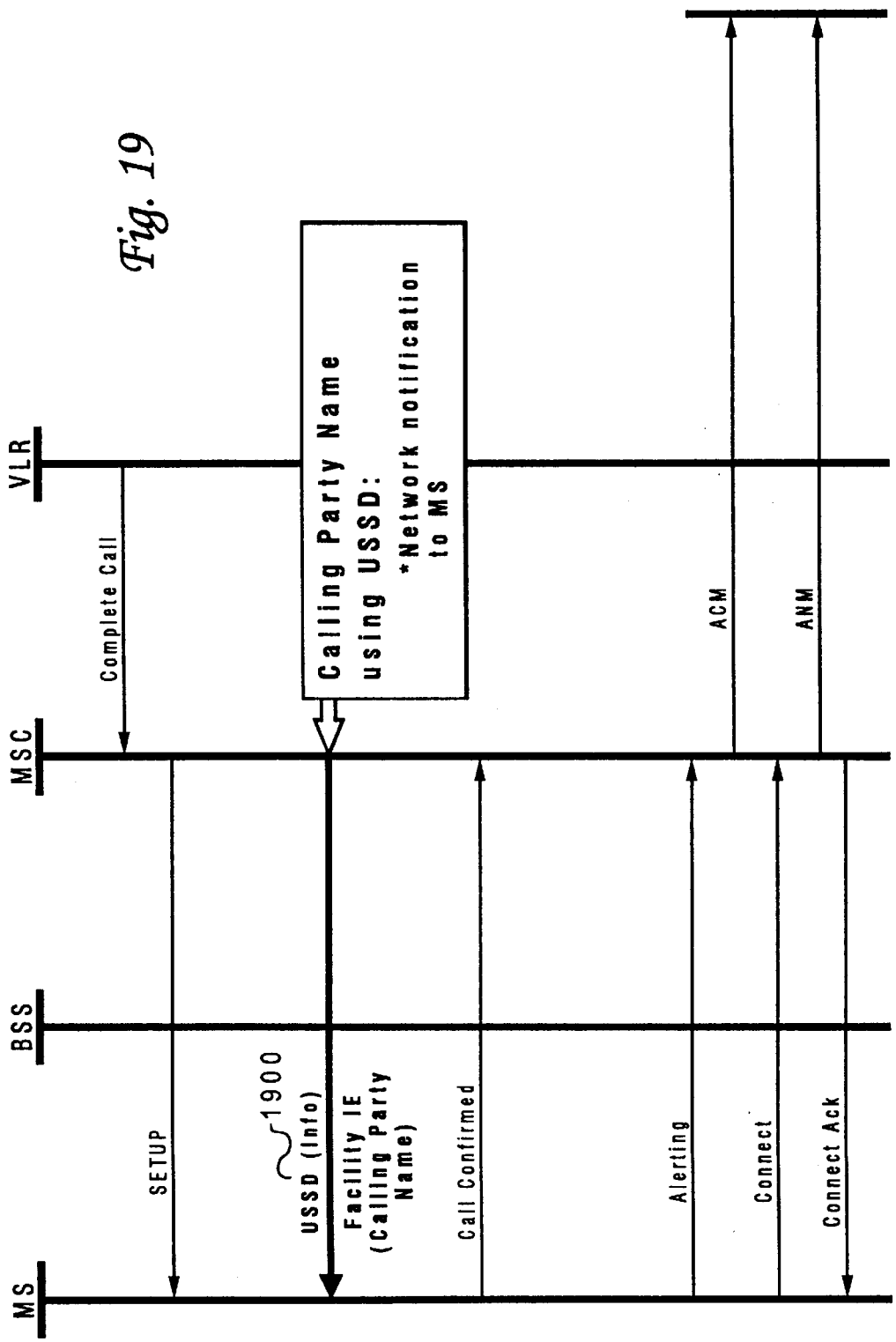

In FIG. 18, the MSC sends calling party name information within a information or Notify message sent from the MSC to the mobile station (step 1800). This may be sent within a Facility IE or a Display Text IE message. The information or Notify message is a new message not presently defined for GSM systems. Alternatively, in FIG. 19, a USSD (Info) message is sent from the MSC to the mobile station (step 1900) with a Facility IE containing the calling party name. Again as with FIGS. 14 and 15, FIGS. 18–19 also illustrate other messages to provide a context for the messages containing calling party name information.

Figure 20:
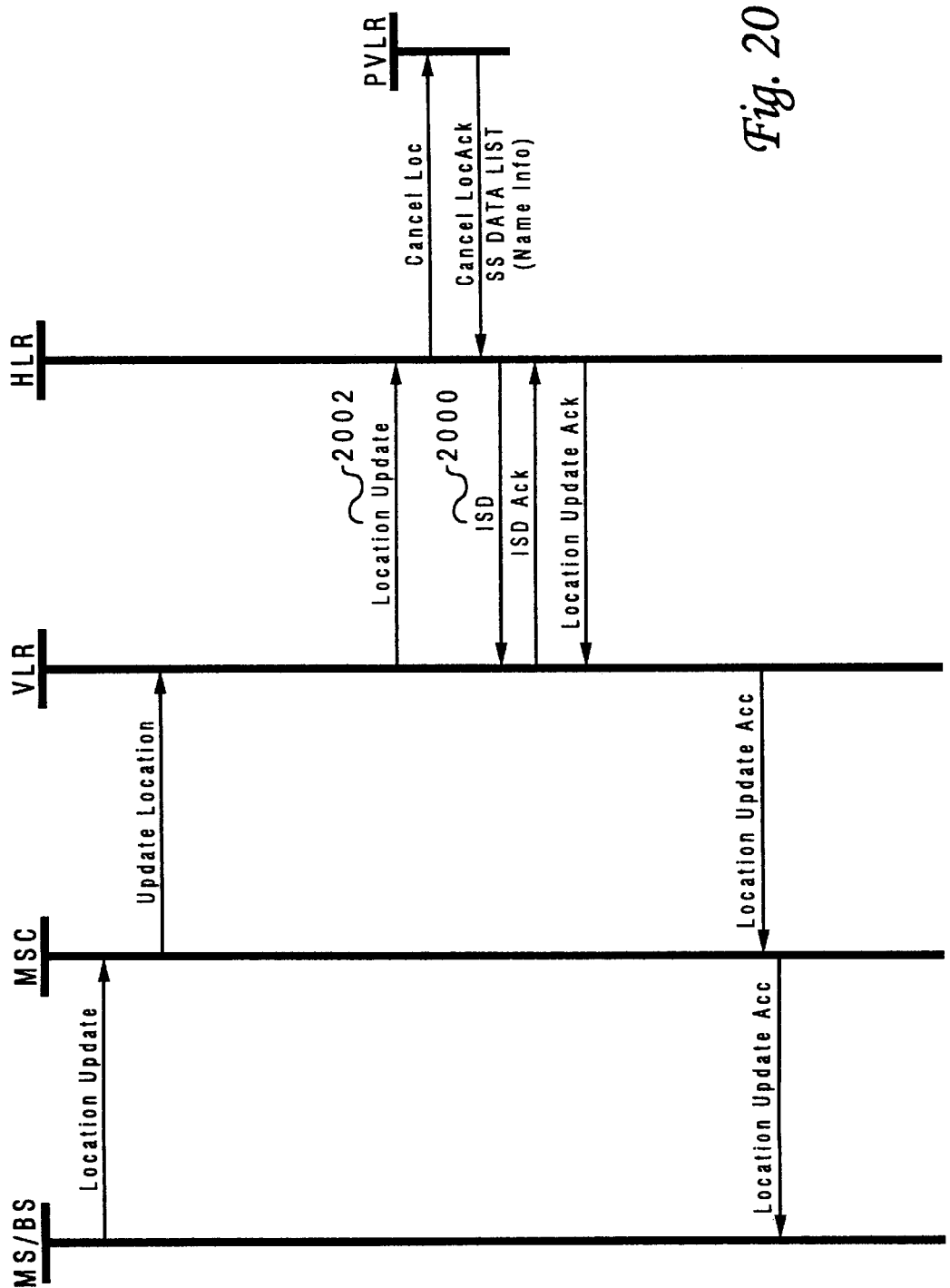
FIG. 20 is a diagram of a message flow used for inter-visitor location register (inter-VLR) location update and register according to the present invention.

With reference now to FIG. 20, a diagram of a method of message flow used for inter-VLR location update and register is depicted according to the present invention. FIG. 20 illustrates when and how CNAP subscription information is sent out to the VLR from the HLR. The HLR sends an ISD message back to the VLR (step 2000) in response to receiving a request for a location update from the VLR (step 2002). As can be seen in step 2000, the ISD message includes a SS data list, which is a list of supplementary services supported for the mobile station in which the update is being performed. With this information, a subscriber at a mobile station may perform a status check to request the status of supplementary services and to determine whether the service is being provided to the subscriber. In addition, the ISD message in step 2000 may be enhanced to include the name information of the mobile system subscriber. This means that the HLR contains the names of the mobile station subscribers. The VLR stores the name once received in the ISD message in step 2000.

Figure 21:
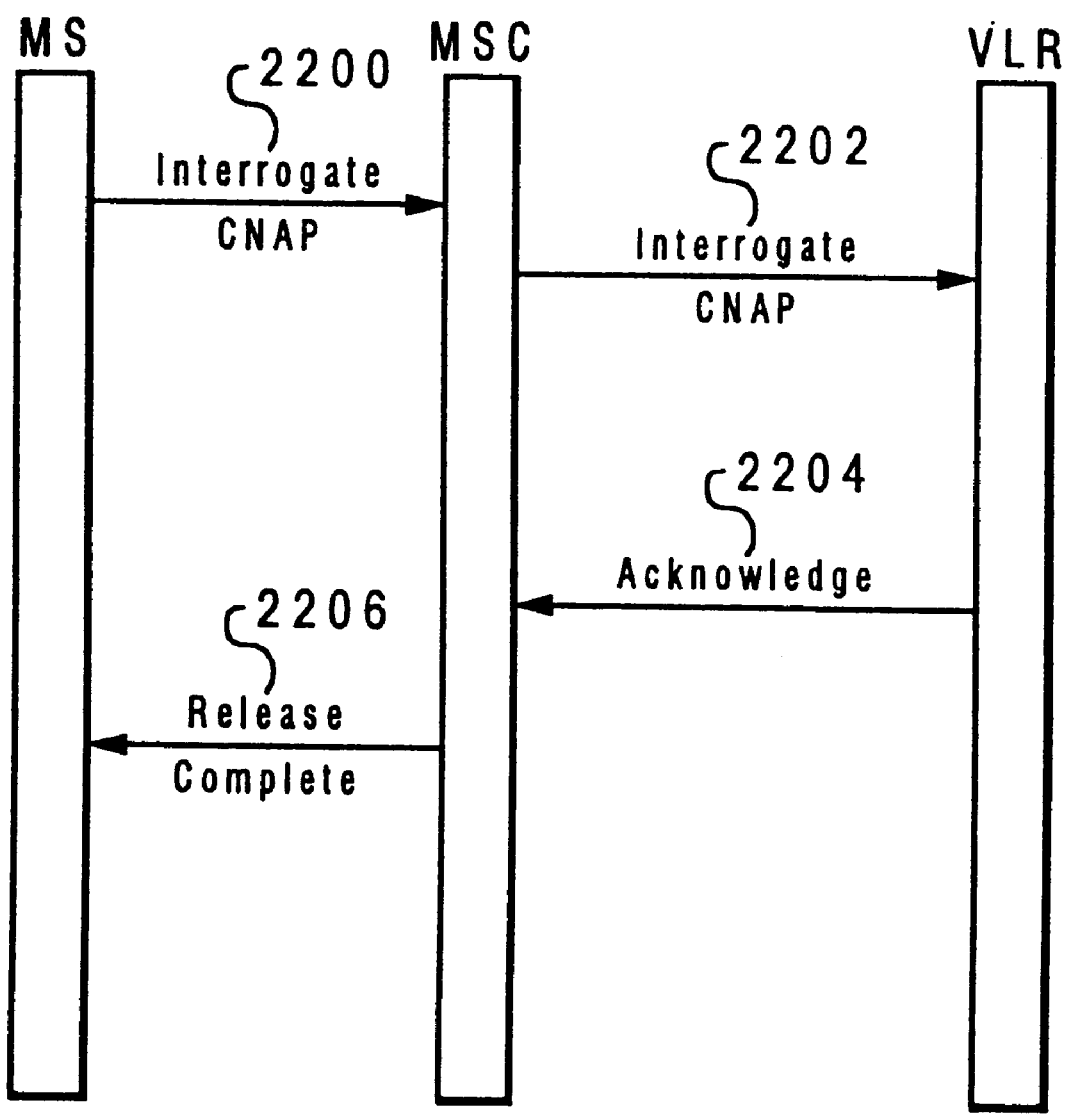
FIG. 21 is a diagram of a message flow used for determining whether a subscriber has calling name presentation as a supplementary service according to the present invention.

In FIG. 21, message flow used for determining whether a subscriber has calling name presentation as a supplementary service is depicted according to the present invention. The process begins with a mobile station sending a Interrogate message to the MSC (step 2100). The Interrogate message includes a request to determine whether a subscriber has CNAP. The Interrogate message is sent from the MSC to the VLR (step 2102) and an acknowledge message is returned from the VLR to the MSC (step 2104). This acknowledged message contains the status of the supplementary service for the mobile station. In response, the MSC sends a Release Complete message to the mobile station providing the subscriber at the mobile station the status of the supplementary service requested in the status check (step 2106).

It is important to note that while the present invention has been described in the context of a communications system including processors for processing instructions to provide the functions described, the processes of the present invention are capable of being distributed in the form of a computer readable medium of instructions in a variety of forms that the present invention applies equally regardless of the particular type of signal bearing media actually used to carry out the distribution. Examples of computer readable media include: recordable-type media such as floppy disks and CD ROMs and transmission-type media such as digital and analog communications links.

Although the description of signaling for interconnection between MSCs and a PSTN in the present invention has been described in the context of SS7 ISUP, an ANSI SS7 standard, the present invention may be applied to other forms of signaling, such as ISDN or MF-FGD. Additionally, although the depicted examples employ GSM messages in a GSM system for wireless technologies, the present invention also may be applied to other wireless technologies (CDMA, TDMA, and AMPS), such as, for example, IS-41. For example, an SRI message in GSM would be a location request in IS-41. Similarly, a PRN message in GSM would be a route request message in IS-41; a location update message in GSM would be a registration message in IS-41.

Additionally, the present invention may be employed to deliver and present redirecting of party's name in call forwarding, call transfer, and call deflection scenarios.

The description of the preferred embodiment of the present invention has been presented for purposes of illustration and description, but is not intended to be exhaustive or limit the invention in the form disclosed. Many modifications and variations will be apparent to those of ordinary skill in the art. The embodiment was chosen and described in order to best explain the principles of the invention and the practical application to enable others of ordinary skill in the art to understand the invention for various embodiments with various modifications as are suited to the particular use contemplated.

What is claimed is:

1. A method for presenting a calling party name to a mobile station, comprising:

receiving a communications signal from a network coupled to a wireless communications system to initiate a call to a mobile station within the wireless communications system, wherein the communications signal includes a generic name and a calling party number for a calling party;

determining whether presentation of the generic name is restricted;

seeking a calling party name associated with the calling party number within a database located within the wireless communications system in response to determining that presentation of the generic name is not restricted; and sending the calling party name to the mobile station in response to locating the calling party name associated with the calling party number within the database.

2. The method of claim 1, further comprising:

sending an indication that the calling party name is unavailable in response to failing to locate the calling party name associated with the calling party number in the database.

3. The method of claim 1, further comprising:

sending an indication that the calling party name is private in response to determining that presentation of the generic name is restricted.

4. The method of claim 1, when the sending step includes sending the calling party name to the mobile station prior to completing a connection for the call with the mobile station.

5. The method of claim 4, wherein the wireless communications system is a GSM wireless communications system and wherein the sending step further includes sending the calling party name after a Setup message is sent to the mobile station, and prior to a connect message being sent to the mobile station.

6. The method of claim 4, wherein the sending step further comprises sending the calling party name in a Setup message sent to the mobile station.

7. The method of claim 4, wherein the sending step further comprises sending the calling party name to the mobile station in a Facility message sent to the mobile station after a Setup message.

8. The method of claim 1, wherein the step of identifying a calling party name comprises using a name database coupled to a mobile switching center.

9. The method of claim 1, wherein the step of identifying a calling party name comprises using a name database within a home location register coupled to a mobile switching center.

10. A method of presenting a calling party name to a mobile station, comprising:

initiating a call to a mobile station within a wireless communications system;

determining whether the mobile station has a subscription for calling party names;

responsive to determining that the mobile station has a subscription for calling party names and to receiving an unrestricted generic name and a calling party number for a calling party associated with the call, looking up a calling party name for a calling party number in a database within the wireless communications system;

sending calling party information identified from the database lookup to the mobile station; and displaying the calling party information on the mobile station in response to receiving the calling party information.

11. The method of claim 10, wherein the step of sending calling party information includes sending a name of the calling party.

12. The method of claim 10, wherein the step of sending calling party information comprises sending an indication that a calling party name is unavailable.

13. The method of claim 10, wherein the step of sending calling party information comprises sending an indication that a calling party name is private.

14. The method of claim 10, when the sending step includes sending the calling party information to the mobile station prior to a connection with the mobile station.

15. The method of claim 14, wherein the wireless communication system is a GSM wireless communication system and wherein the sending step further includes sending the calling party information after a Setup message is sent to the mobile station, and prior to a connect message being sent to the mobile station.

16. The method of claim 14, wherein the sending step further comprises sending the calling party information in a Setup message sent to the mobile station.

17. The method of claim 14, wherein the sending step further comprises sending the calling party information to the mobile station in a Facility message sent to the mobile station after a Setup message.

18. A wireless communications system comprising:
a database containing a plurality of calling party names associated with calling party numbers;
a mobile switching center, wherein the mobile switching center:
receives a message for initiating a call from a calling party to a mobile station within the wireless communications system, the message containing a generic name and a calling party number for the calling party;
if the generic name is unrestricted, searches the database for a calling party name using the calling party number; and
sends the calling party name, if available, to the mobile station.

19. The wireless communications system of claim 18, wherein the mobile switching center sends an indication that a name for the calling party name is unavailable when the calling party number cannot be located within the database.

20. The wireless communications system of claim 18, wherein the mobile switching center sends an indication that a name of the calling party name is private when the generic name received with the message is restricted.

21. The wireless communications system of claim 18, wherein the mobile switching center sends the calling party name to the mobile station prior to sending voice data to the mobile station.

22. The wireless communications system of claim 21, wherein the wireless communication system is a GSM wireless communication system and wherein the mobile switching center sends the calling party name after a Setup message is sent to the mobile station, and prior to a connect message being sent to the mobile station.

23. The wireless communications system of claim 21, wherein the mobile switching center sends the calling party name in a Setup message sent to the mobile station.

24. The wireless communications system of claim 21, wherein the mobile switching center sends the calling party name to the mobile station in a Facility message sent to the mobile station after a Setup message.

25. The wireless communications system of claim 18, wherein the database is coupled to the mobile switching center.

26. The wireless communications system of claim 18 further comprising:
a home location register, wherein the database is located within the home location register.

27. The wireless communications system of claim 18 further comprising:
a home location register, wherein the database is connected to the home location register.

28. The wireless communications system of claim 18 further comprising:
a visitor location register connected to the mobile switching center, wherein the database is connected to the visitor location register.

29. The wireless communications system of claim 18, wherein the wireless communications system is a CDMA based wireless communications system.

30. The wireless communications system of claim 18, wherein the wireless communications system is a TDMA based wireless communications system.

31. A wireless communications system comprising:
a database containing a plurality of calling party names associated with calling party numbers;
a mobile switching center having a plurality of modes of operation including:
a first mode of operation in which the mobile switching center receives a message to initiate a call to a mobile station within the wireless communications system, the message including a generic name and a calling party number for a party initiating the call;
a second mode of operation, responsive to receiving an unrestricted generic name within the message, in which the mobile switching center searches the database for a calling party name using the calling party number in the message; and
a third mode of operation, responsive to receiving a result from searching the database, in which the mobile switching center sends the calling party name to the mobile station.

32. The wireless communications system of claim 31, wherein the mobile switching center includes a fourth mode of operation in which the mobile switching center sends an indication that a name for the calling party name is unavailable in response to not receiving a result from searching the database.

33. The wireless communications system of claim 31, wherein the mobile switching center includes a fourth mode of operation in which the mobile switching center sends an indication that a name of the calling party name is private when the generic name is restricted.

34. The wireless communications system of claim 31, wherein the mobile switching center sends the calling party name to the mobile station prior to sending voice data to the mobile station.

35. The wireless communications system of claim 34, wherein the wireless communication system is a GSM wireless communication system and wherein the mobile switching center sends the calling party name in the third mode of operation after a Setup message is sent to the mobile station, and prior to a connect message being sent to the mobile station.

36. The wireless communications system of claim 34, wherein the mobile switching center sends the calling party name in the third mode of operation in a Setup message sent to the mobile station.

37. The wireless communications system of claim 34, wherein the mobile switching center sends the calling party name in the third mode of operation to the mobile station in a Facility message sent to the mobile station after a Setup message.

38. The wireless communications system of claim 31, wherein the wireless communications system is a CDMA based wireless communications system.

39. The wireless communications system of claim 31, wherein the wireless communications system is a TDMA based wireless communications system.

40. A wireless communications system comprising:

a home location register; and a subscriber profile stored within the home location register, wherein a calling party name is stored with a calling party number as part of the subscriber profile for calling party name lookup and delivery to a called subscriber when an unrestricted generic name is initially received for a call to the called subscriber.

41. A wireless communications system comprising:

a visitor location register; and a subscriber profile stored within the visitor location register, wherein a calling party name is stored with a calling party number as part of the subscriber profile for calling party name lookup and delivery to a called subscriber when an unrestricted generic name is initially received for a call to the called subscriber.

* * * * *